W. H. PARSONS.
CHANGE SPEED GEARING.
APPLICATION FILED MAR. 30, 1910.
992,044.
Patented May 9, 1911.
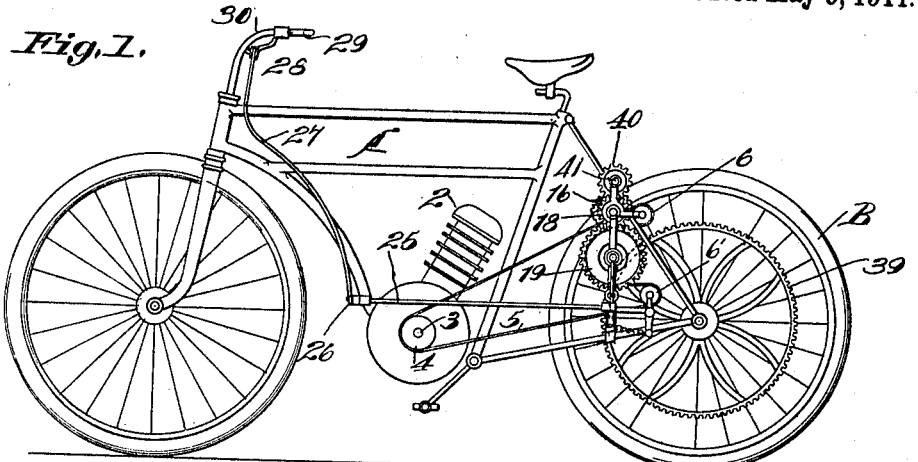
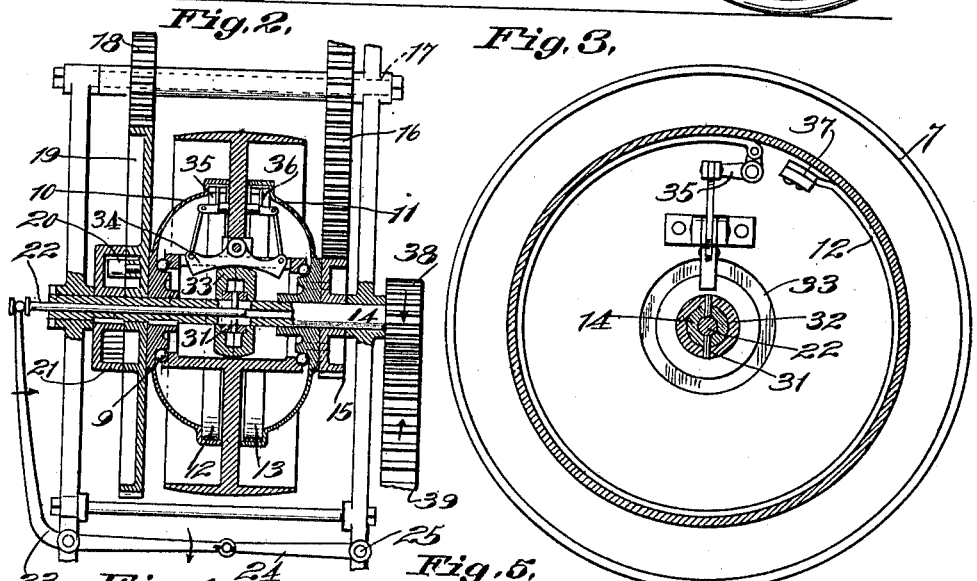
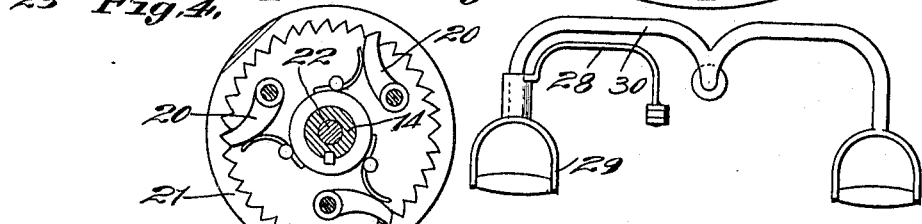
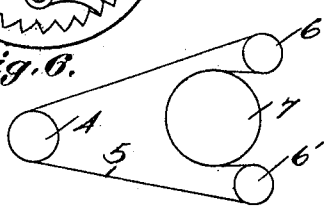
Witnesses:
F. E. Maynard
T. Castberg
Inventor:
William H. Parsons,
By G. H. Strong
his Atty.

UNITED STATES PATENT OFFICE.

WILLIAM H. PARSONS, OF MIDDLETOWN, CALIFORNIA.

CHANGE-SPEED GEARING.

992,044. Specification of Letters Patent. Patented May 9, 1911.

Application filed March 30, 1910. Serial No. 552,312.

*To all whom it may concern:*

Be it known that I, WILLIAM H. PARSONS, citizen of the United States, residing at Middletown, in the county of Lake and State of California, have invented new and useful Improvements in Change - Speed Gearing for Motor-Cycles, of which the following is a specification.

This invention relates to a change speed gearing for motor cycles.

The object of this invention is to provide a two-speed gearing which is adapted to be applied to motor cycles and other vehicles, and is so designed and arranged that either the high or low speed may be adjusted so as to engage with the driving mechanism.

Another object is to provide a clutch which will permit of changing speed while the machine is in motion, and to also provide means for assisting the starting of the engine or the slow speed gears.

The invention consists of the parts and the construction and combinations of parts as hereinafter more fully described and claimed, having reference to the accompanying drawings, in which—

Figure 1 is a side view of the invention as applied. Fig. 2 is a vertical section of the friction clutch and change speed mechanism. Fig. 3 is a detail in side elevation of the friction clutch. Fig. 4 is a detail of the pawl and ratchet drive. Fig. 5 is a detail of the operating handle. Fig. 6 is a diagram illustrating the belt drive.

In the drawings A represents a motor cycle having an engine 2 mounted thereon. 3 is the drive shaft of the engine 2, which carries a pulley 4 on its outer end. A belt 5 passes around the drive pulley 4, thence back over direction pulleys 6, 6′ suitably mounted on the frame of the cycle, and thence passes around a pulley wheel 7 located in close proximity to the rear wheel B of the cycle A. This pulley wheel 7 has an elongated hollow hub 8 on the outer ends of which are formed raceways for ball bearings 9 which bear upon similar raceways formed on the peripheries of the hubs of clutch rims 10, 11. These clutch rims 10, 11 are disposed on each side of the belt pulley 7 and form the rims against which the straps 12, 13 of the clutches are adapted to be frictionally engaged, as later described. The hub of the clutch rim 10 is keyed on a tubular shaft 14, and the clutch rim 11 is mounted loosely thereon, the hub of the latter rim 11 being secured to a pinion 15 also loose on the shaft 14. The pinion 15 meshes with a gear 16 mounted on a shaft 17. A pinion 18 on the shaft 17 meshes with a gear 19 loosely mounted on the shaft 14. A series of pawls 20 on the gear 19 engage with the teeth of an internal ratchet wheel 21 which is keyed on the shaft 14, as shown in Fig. 4.

A pinion 38 is mounted on the inner end of the shaft 14 and is in constant engagement with a circular rack 39 mounted on the rear wheel B of the cycle A to drive the latter as the shaft 14 is rotated, as later described.

A rod 22 extends longitudinally within the tubular shaft 14 and is adapted to be reciprocated therein by means of a bell crank 23, one end of which engages the annular groove on the outer end of the rod 22. The other end of the bell crank 23 is connected to a crank arm 24 on a shaft 25, which extends horizontally toward the forward end of the cycle A. A crank 26 on the end of the shaft 25 connects with a curved rod 27 which in turn is connected to an arm 28 on the left handle 29 of the handle bars 30. The handle 29 is pivotally mounted on the bar 30 so as to permit of its being turned from side to side in such manner as to transmit a rocking motion to the bell crank 23, through the rod 27 and shaft 25 and thus reciprocate the rod 22 in the tubular shaft 14.

The inner end of the rod 22 is provided with laterally extending pins 31 which project through longitudinally disposed slots in the shaft 14 and engage a sleeve 32 loose on the shaft 14. A divided cam roller 33 mounted loose on the shaft 14 houses the sleeve 32 and is engaged thereby in such manner as to be moved back and forth on the shaft 14 as the rod 22 is reciprocated; the sleeve 32 permitting of a revolving movement of the shaft 14 independent of the cam roller 33.

The periphery of the cam roller 33 is convexed, as shown in Fig. 2, and is adapted to engage a curved rocking cam lever 34, which extends crosswise of the roller 33 and is pivoted at its center to the hub 8 of the pulley wheel 7, the hub being slotted lengthwise to accommodate the lever 34. The outer ends of the rocking cam lever 34 are linked to bell crank levers 35—36 mounted on the pulley 7 and connecting with the loose ends of the strap clutches 12, 13 respectively, rigidly mounted at one end to the pulley 7, as shown at 37 in Fig. 3; there being one of these straps 12 on one side of the web of pulley 7, and the other strap 13 on the other side, corresponding with the drums 10, 11. These straps 12, 13 are out of contact with the rims or drums 10, 11 when the cam roller 33 is in the central position shown in Fig. 2; but when the roller 33 is moved, for instance, to the left of Fig. 2, the opposite end of the lever 34 is pulled down, throwing its corresponding strap 13 into frictional engagement with its corresponding rim or drum 11; and vice versa the opposite movement of the cam roller 33 rocks the cam lever 34 in the opposite direction and connects the high speed drum 10 to the pulley, 7.

From the foregoing it will be seen that with the parts in the neutral position shown in Fig. 2, with neither clutch in operative position, the pulley wheel 7 and the shaft 14 are free to revolve independent of each other, and in this position permit of the machine being moved without operating the engine through the belt pulley 7 or permit of the engine running without imparting motion to the cycle.

The operation of the invention is as follows: In starting the machine on level ground, the parts being in the neutral position shown in Fig. 2, the high speed clutch, consisting of the drum or rim 10 and strap 12 is first thrown in. This is accomplished by operating the handle 29 in such manner as to rock the bell crank 23 in the direction of the arrows, Fig. 2, and thus move the rod 22 so as to slide the cam roller 33 backward on the shaft 14. This action causes the lever 34 to rock on its pivot, one end being pressed upward by the roller 33, the other moving in a downward direction. This downward movement of the lever 34 pulls upon the bell crank 35 so as to expand the strap 12 and cause it to grip the rim 10. When this has occurred, the pulley wheel 7 is clutched directly to the shaft 14, as the hub of the rim 10 is keyed thereon, as before mentioned, and the engine 2 is then connected to the drive wheel B on the high speed. The operator then moves the machine forward on the ground so as to rotate the drive wheel B, which rotates the shaft 14 and the belt pulley 7 through the clutch 10, 12, so as to rotate the crank shaft 3 of the engine 2 and start the latter in the well known manner.

To throw in the slow speed gears, the bell crank 25 is rocked in the opposite direction so as to slide the roller 33 to the opposite end of the lever 34 and thus throw the strap 13 into engagement with the clutch rim 11, and release the strap 12 from the rim 10. In this position the engine 2 will be connected to the drive wheel B through the belt pulley 7, clutch 11, 13, the train of gears 15, 16, 18, 19, and the pawl and ratchet drive 20, 21, which is keyed to the shaft 14 so as to rotate the latter at a slow speed and drive the cycle through the pinion 38 and rack 39.

The pawls 20 and ratchet 21 are so arranged that when the gear 19 is rotated as just described, the ratchet 21 will travel therewith by reason of the pawls 20 being in constant engagement with the ratchet teeth and thus rotate the shaft 14 at slow speed. The ratchet disk 21 being keyed to the shaft 14 also rotates therewith when the latter is revolved on the high speed, in which case the gear 19 stands still and the ratchet 21 rides free under the pawls 20.

As a means of enabling the operator to start the machine on the slow speed, as would be necessary in starting on an upward grade, a pinion 40 is provided which meshes with the gear 16, and is mounted on a shaft 41 to which a crank (not shown) may be attached. The slow speed clutch being thrown in, the operator rotates the pinion 40 by means of a crank, thus driving the shaft 41 through the train of gears before described, to move the machine ahead, and at the same time rotates the belt pulley 7 so as to start the engine in the well known manner.

Having thus described my invention, what I claim and desire to secure by Letters-Patent, is:

1. In a transmission mechanism, a driven shaft, a pulley loose on said shaft, a drum fixed to the shaft on one side of the pulley, and a drum loose on the shaft on the other side of the pulley, driving connections between the loose drum and said shaft, and means for locking either drum to the pulley, said last named means including a cam member shiftable lengthwise of the shaft.

2. In a transmission mechanism, a driven shaft, a pulley loose on said shaft, a drum fixed to the shaft on one side of the pulley, and a drum loose on the shaft on the other side of the pulley, driving connections between the loose drum and said shaft, means for locking either drum to the pulley, said last named means including a cam member shiftable lengthwise of the shaft, and a cam lever engageable by said member with friction means operated by each end of the lever engaging with one of said drums.

3. In a transmission mechanism, a hollow driven shaft, a loose pulley thereon, a friction drum mounted on the shaft on each side of the pulley, and means operated through the hollow shaft for connecting either drum to the pulley.

4. In a transmission mechanism, a hollow driven shaft, a loose pulley thereon, a friction drum mounted on the shaft on each side of the pulley, means operated through the hollow shaft for connecting either drum to the pulley, said last named means including a roller loosely mounted on the shaft and slidable thereon, a cam lever pivoted in the pulley and engageable by the roller, and friction straps connected with the pulley and with the ends of said lever and engageable with one of said drums.

In testimony whereof I have hereunto set my hand in the presence of two subscribing witnesses.

WILLIAM H. PARSONS.

Witnesses:
HAMLIN W. HERRICK,
CHAS. W. YOUNG.

Copies of this patent may be obtained for five cents each, by addressing the "Commissioner of Patents, Washington, D. C."